United States Patent [19]
Clare et al.

[11] Patent Number: 5,980,607
[45] Date of Patent: Nov. 9, 1999

[54] STEELMAKING METHOD WITH OXYGEN FROM RECTIFICATION OF AIR

[75] Inventors: Stephen Roger Clare, Bognor Regis; Martin Imre Mayer, Ealing London, both of United Kingdom

[73] Assignee: The BOC Group plc, Windlesham, United Kingdom

[21] Appl. No.: 08/841,746

[22] Filed: Apr. 30, 1997

[30] Foreign Application Priority Data

May 1, 1996 [GB] United Kingdom ............... 9609099

[51] Int. Cl.⁶ ............................. C21B 5/00; C21C 7/068
[52] U.S. Cl. ............................. 75/548; 75/10.4; 75/466; 75/503
[58] Field of Search ................. 75/548, 10.4, 466, 75/503

[56] References Cited

U.S. PATENT DOCUMENTS 5,538,534  7/1996  Guillard et al. ................... 266/144

FOREIGN PATENT DOCUMENTS

| 0 357 299 | 7/1990 | European Pat. Off. . |
| 0 628 778 | 12/1994 | European Pat. Off. . |
| 2 376 900 | 4/1978 | France . |
| 800 303 | 9/1950 | Germany . |
| 1059483 | 6/1955 | Germany . |
| 1433652 | 9/1969 | Germany . |

*Primary Examiner*—Melvyn Andrews
*Attorney, Agent, or Firm*—David M. Rosenblum; Salvatore P. Pace

[57] ABSTRACT

A method of supplying both an oxygen steelmaking process and an ironmaking process with oxygen. The oxygen is separated from air by rectification of the air. A first stream of oxygen from the rectification to the steelmaking process. A second stream of oxygen is also supplied from the rectification to the ironmaking process. The first and second streams of oxygen are both withdrawn from essentially the same stage of the rectification and both contain from about 97 to about 98% by volume of oxygen and less than about 100 parts per million of nitrogen.

5 Claims, 1 Drawing Sheet

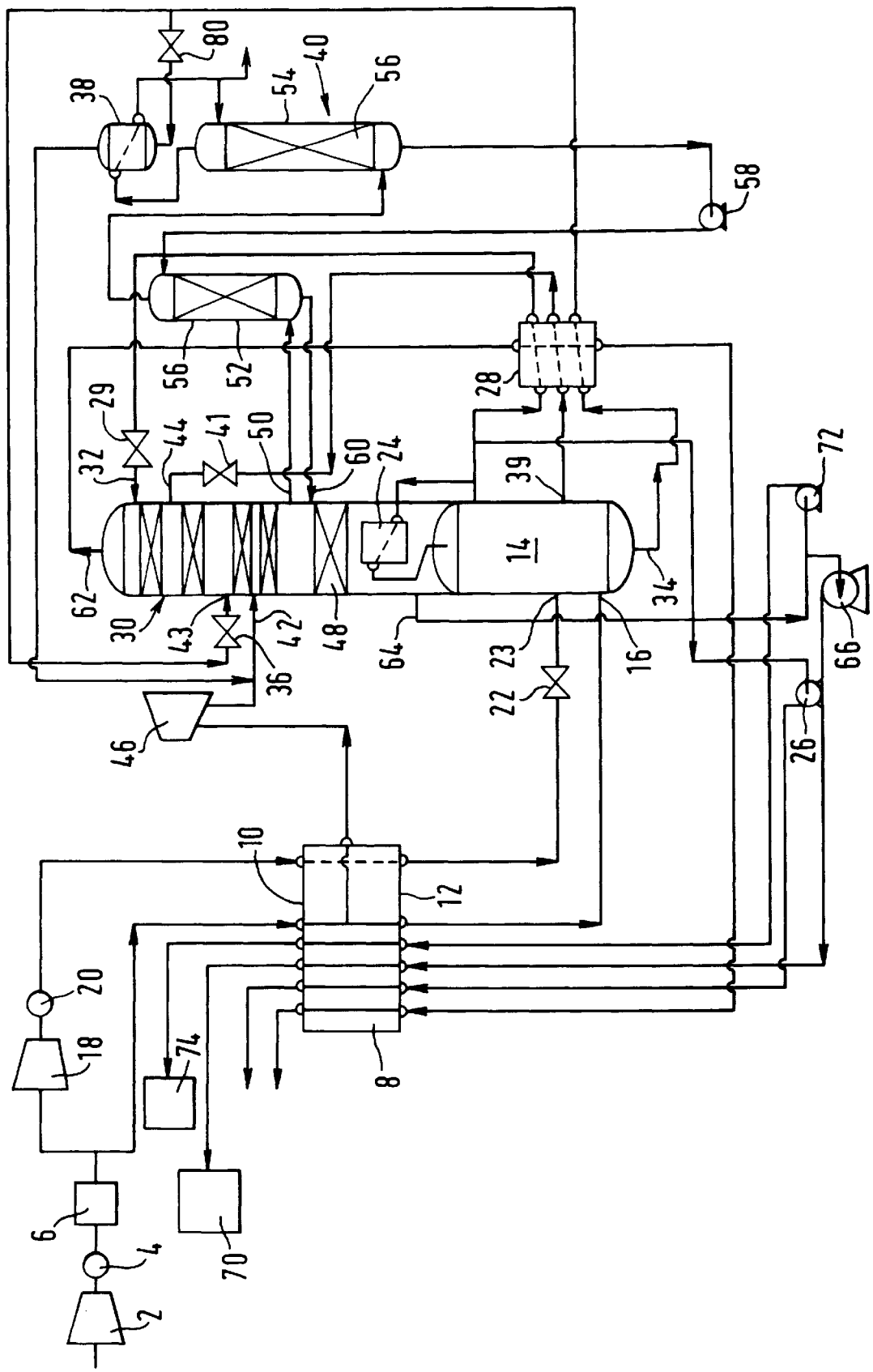

2

STEELMAKING METHOD WITH OXYGEN FROM RECTIFICATION OF AIR

BACKGROUND OF THE INVENTION

This invention relates to oxygen steelmaking.

Oxygen steelmaking is one of the main building blocks of a modern industrial economy. There are a range of different oxygen steelmaking processes, including the open hearth process, bottom blown steelmaking processes, including the Bessemer and Q-BOP processes, top blown converter processes including the LD-AC process (also known as BOS (basic oxygen steelmaking) or BOP (basic oxygen process)), and electric arc furnace processes which include the step of lancing molten ferrous metal with oxygen.

High purity oxygen (i.e. oxygen having a purity of greater than 99%) has always been used in such oxygen steelmaking processes because nitrogen has a deleterious effect on steel. In order to form the high purity oxygen air is separated by rectification. The composition of air is such that in order to achieve such purity levels, a rectification column from which the oxygen product is taken has a section for separating argon from oxygen. Since argon and oxygen have similar volatilities to one another, this section contributes substantially to the total height of the rectification column and to the total energy requirements of the air separation process.

It is a general aim of modern air separation processes to minimise the power consumption of the air separation plant without adding unduly to its capital cost.

It is sometimes required that the same air separation plant should supply both a steelmaking and an iron making process. The iron making process may employ a conventional blast furnace which is fed with a charge comprising iron oxide, coke and at least one slagging or fluxing agent, or be a so-called direct reduction process in which coal is used instead of coke. In a direction reduction process, the charge is fed to a reduction vessel in which the iron ore is reduced by a gas mixture comprising hydrogen or carbon monoxide and the resulting iron is melted in a second vessel in which the coal is simultaneously gasified so as to produce the reducing gas mixture. 95% pure oxygen is typically used for the gasification of the coal. As a result, the capital and operating costs of the air separation plant are less when an oxygen product of greater than 99% purity is also required. Once, however, there is this requirement to produce such a pure oxygen product, there is a need to reboil the high purity liquid oxygen at the bottom of the rectification column from which the oxygen products are taken. The higher the purity of the oxygen, the higher is its reboiling temperature at a given pressure. As a result, the pressure of the gas used to reboil the high purity oxygen increases with increasing oxygen purity and therefore more work is expended in raising the pressure of this gas. Further, when oxygen products of different purity are required, there are increased costs associated with additional pipework and distributors.

The present invention addresses these problems.

SUMMARY OF THE INVENTION

According to a first aspect of the present invention there is provided an oxygen steelmaking method including the step of contacting molten ferrous metal with a flow of oxygen gas separated from air by rectification, wherein the oxygen gas contains from about 97 to about 98% by volume of oxygen but less than about 100 parts per million by volume of nitrogen.

According to a second aspect of the present invention there is provided a method of supplying both an oxygen steelmaking process and an ironmaking process with oxygen, comprising separating oxygen from air by rectification of the air, supplying a first stream of oxygen from the rectification to the steelmaking process, supplying a second stream of oxygen from the rectification to the ironmaking process, wherein the first and second streams of oxygen are both withdrawn from essentially the same stage of the rectification and both contain from about 97 to about 98% by volume of oxygen and less than about 100 parts per million by volume of nitrogen.

According to a third aspect of the present invention there is provided apparatus comprising a steelmaking vessel, an ironmaking vessel and a rectification column for separating oxygen from air, wherein both the ironmaking vessel and the steelmaking vessel communicate with the same stage of the rectification column, which stage is in a position in the column such that both the ironmaking vessel and the steelmaking vessel receive, in use, an oxygen product containing from about 97 to about 98% by volume of oxygen and less than about 100 parts per million by volume of nitrogen.

By taking as product oxygen gas containing from about 97 to about 98% by volume substantially fewer stages are needed in the rectification column from which the oxygen product is taken in comparison with a comparable rectification column in which a pure oxygen product is produced. Further, in the methods and apparatus according to the invention reboiling of the rectification column can be effected by indirect heat exchange with a gas stream at lower pressure than in a comparable rectification column in which a pure oxygen product is produced, thereby making possible power savings. Indeed reduced operating and capital costs of air separation are achieved by taking all the oxygen at a purity of about 97 to about 98% by volume rather than by taking a first oxygen product at a purity of about 95% by volume and a second oxygen product at about 99.7% by volume.

Preferably, the nitrogen content of the oxygen is less than about 50 parts per million by volume, and more preferably it is less than about 10 parts per million by volume. Such low nitrogen impurity levels can readily be achieved even though the oxygen purity is in the range of about 97 to about 98% by volume, particularly if the rectification column from which the oxygen is taken is a low pressure column operatively associated with a higher pressure rectification column, and if an argon-enriched oxygen stream is withdrawn from the low pressure rectification column for separation in a further rectification column. As a result of the withdrawal of the argon-enriched oxygen stream, nitrogen impurity is effectively withdrawn from the oxygen-argon separation section in the low pressure rectification column. It is found that the level of nitrogen impurity in the oxygen streams can be effectively controlled by controlling the flow rate of coolant through a condenser associated with the head of the further column.

The oxygen product provided to the steelmaking process are that to the ironmaking process are preferably taken from the bottom region of a rectification column (i.e. below all liquid-vapour contact elements in the column). The oxygen streams may be taken both in liquid state or both in vapour state, or one in liquid state and the other in vapour state.

Typically, from about 10 to about 30% of the total oxygen product is supplied to the steelmaking process and the balance to the iron making process.

The term "rectification column", as used herein, means a distillation or fractionation column, zone or zones, wherein liquid and vapour phases are countercurrently contacted to effect separation or purification of the fluid mixture, as for example, by contacting the vapour and liquid phases on packing elements or a series of vertically spaced trays or plates mounted within the column, zone or zones. A rectification column may comprise a plurality of fractionation zones in separate vessels so as to avoid a single vessel of undue height. For example, it is known to use a height of packing amounting to 200 theoretical plates in an argon rectification column. If all this packing were housed in a single vessel, the vessel may typically have a height of over about 50 meters. It is therefore obviously desirable to construct the argon rectification column in two separate vessels so as to avoid having to employ a single, exceptionally tall, vessel.

BRIEF DESCRIPTION OF THE DRAWINGS

The methods and apparatus according to the present invention will now be described by way of example with reference to the accompanying drawing which is a schematic flow diagram of an air separation plant for supplying a first stream of oxygen at elevated pressure to a steelmaking process and a second stream of oxygen at elevated pressure to an ironmaking process.

The drawing is not to scale.

DETAILED DESCRIPTION

Referring to the drawing, a flow of air is compressed in a compressor 2. Heat of compression is removed from the compressed air in an aftercooler 4. The resulting compressed feed air stream flows from the aftercooler 4 through a purification unit 6 effective to remove water vapour and carbon dioxide therefrom. The unit 6 employs beds (not shown) of adsorbent to effect this removal of water vapour and carbon dioxide. Such a purification unit and its operation are well known in the art and need not be described further herein.

A part of the purified air stream flows through a main heat exchanger 8 from its warm end 10 to its cold end 12 and is thereby cooled from approximately ambient temperature to approximately its saturation temperature. The thus cooled air stream, in vaporous state, enters the bottom region of a higher pressure rectification column 14 through an inlet 16. The higher pressure rectification column 14 typically has an operating pressure of about 5 bar absolute at its top.

Another part of the purified air stream is taken from upstream of the main heat exchanger 8 and is further compressed in a booster-compressor 18. Heat of compression is removed from the further compressed air in an aftercooler 20. This air stream flows from the aftercooler 20 through the main heat exchanger 8 from its warm end 10 to its cold end 12. The air stream is thereby liquefied. The resulting liquid air flows via a throttling valve 22 through an inlet 23 into the higher pressure rectification column 14 at a level above that of the inlet 16.

The higher pressure rectification column 14 contains liquid-vapour contact means (not shown) such as sieve trays or packing elements so as to effect intimate contact between a rising vapour and a descending liquid. The air is thereby separated into an oxygen-enriched liquid air fraction at the bottom of the column 14 and a nitrogen vapour fraction at the top of the column 14. A nitrogen vapour stream flows from the top of the column 14 into a reboiler-condenser 24 and is condensed by indirect heat exchange with a boiling liquid. A first part of the resulting nitrogen condensate is returned to the higher pressure rectification column 14 and provides reflux for that column. A second part of nitrogen condensate is pressurised by a pump 26 to a chosen elevated pressure and flows through the main heat exchanger 8 from its cold end 12 to its warm end 10 and is vaporised therein by indirect heat exchange with the air stream. As a result a pressurised gaseous nitrogen product is formed. A third part of the nitrogen condensate from the reboiler-condenser 24 is sub-cooled in a heat exchanger 28, is passed through a throttling valve 29 and is introduced into a top region of a low pressure rectification column 30 through an inlet 32. The low pressure rectification column 30 operates with a pressure at its top of less than 1.5 bar absolute.

A stream of oxygen-enriched liquid air, typically containing from 30 to 40% by volume of oxygen, is withdrawn from the bottom of the higher pressure rectification column 14 through an outlet 34 and flows through the heat exchanger 28 in the same general direction as the nitrogen condensate. As a result, the oxygen-enriched liquid air is sub-cooled. The resulting sub-cooled oxygen-enriched liquid air is divided into two flows. One flow passes directly to a throttling valve 36 and flows therethrough into the low pressure rectification column 30 through an inlet 43. The other flow of sub-cooled oxygen-enriched liquid air passes through a condenser 38 which is associated with an argon column 40. In consequence of its heat exchange in the condenser 38 with condensing argon, the oxygen-enriched liquid is vaporised in the condenser 38. The resulting vapour also flows to the low pressure rectification column 30, being introduced into this column through an inlet 42.

Further air for separation in the low pressure rectification column 30 is formed by taking a stream of purified air at approximately the pressure of the higher pressure rectification column 14 from an intermediate region of the main heat exchanger 8 and expanding it with the performance of external work in an expansion turbine 46. The expanded air leaves the turbine 46 at a pressure that enables it to be introduced into the low pressure rectification column 30 without any substantial pressure drop and at approximately its saturation temperature. The expanded air flow is typically premixed with the vaporised oxygen-enriched liquid air taken from the condenser 38.

Yet further air for separation in the low pressure rectification column is provided by withdrawing a stream of liquid air from the higher pressure rectification column through an outlet 39 at the same level as the inlet 23. The liquid air stream is sub-cooled by passage through the heat exchanger 28, is passed through a throttling valve 41 and is introduced into the low pressure rectification column 30 through an inlet 44. Typically, the flow rate of the liquid air introduced into the column 30 through the inlet 44 is from two-thirds to three-quarters that of liquid air into the higher pressure rectification column 16 through the inlet 23.

The low pressure rectification column 30 contains packing elements 48 (typically of structured packing) which enable ascending vapour to be contacted with descending liquid. As a result of this contact, separation of the air takes place. A liquid oxygen fraction is collected at the bottom of the low pressure rectification column 30 and a nitrogen vapour fraction is collected at the top of the low pressure rectification column 30. Vapour flow upwardly through the column 30 is created by vaporisation of part of the liquid oxygen fraction in the reboiler-condenser 24 by indirect heat exchange with the condensing nitrogen vapour. An argon-enriched oxygen vapour stream is withdrawn from an intermediate level of the low pressure rectification column 30 through an outlet 50 and flows into the further rectification column 40 and has argon separated therefrom within the column 40. The argon column 40 is split into two parts. There is a first part-argon rectification column 52 and a second part-argon rectification column 54. Both the part-columns 52 and 54 contain packing elements 56, for example a structured packing, to effect intimate liquid-vapour contact therein. The part-column 52 receives the argon-enriched oxygen vapour stream in a bottom region thereof and the top of the part-column 54 is operatively associated with the argon-condenser 38. A stream of liquid argon flows from the condenser 38 downwardly through the part column 54 from the bottom of which it is transferred by a pump 58 to the top of the part column 52. The liquid descends the part column 52 countercurrently to the argon-enriched oxygen vapour. The vapour is further enriched in argon and flows from the top of the part column 52 into the bottom of the part column 54 and further contact between rising vapour and descending liquid takes place in the column 54. As a result, substantially oxygen-free argon vapour is produced at the top of the column 54 and it is this vapour which flows into the condenser 38. A stream of the argon condensate is taken from the condenser 38 as product may be further purified for example by removal of nitrogen therefrom. Liquid collecting at the bottom of part column 52 is returned to the low pressure rectification column 30 through an inlet 60.

A nitrogen stream is withdrawn through an outlet 62 from the top of the low pressure rectification 30 and passes through the further heat exchanger 26, thereby providing the necessary cooling for the streams being sub-cooled therein. The nitrogen stream passes from the heat exchanger 26 through the main heat exchanger 8 from its cold end 12 to its warm end 10 is thereby warmed to approximately ambient temperature. A liquid oxygen stream is withdrawn from the bottom of a low pressure rectification column 30 through an outlet 64. A part of the liquid oxygen is pumped by a pump 66 to a pressure in the order of 10 bar absolute and is vaporised by flow through the main heat exchanger 8 from its cold end 12 to its warm end 10. The resulting vaporised oxygen at a pressure in the order of 10 bar absolute is provided to an oxygen steelmaking vessel 70. A second oxygen product stream is pressurised to a pressure in the order of between 20 and 40 bar absolute by a pump 72 and flows from the pump 72 through the main heat exchanger 8 from its cold end 12 to its warm end 10 and is thereby vaporised. The resulting vaporised stream of oxygen is supplied at a pressure of about 20 bar absolute to the gasifier 74 of a direct reduction Corex iron making process.

The low pressure rectification column 30 is operated such that the two streams of product oxygen contain from about 97 to about 98% by volume of oxygen, the balance being essentially argon. No more than about 10 volumes per million of nitrogen impurity is present in the oxygen. The balance of both oxygen products consists of argon and trace impurities such as xenon, krypton and methane. The level of nitrogen impurity in the product oxygen may be indirectly controlled by means of a flow control valve 80 located in a pipeline which supplies the condenser 38 with oxygen-enriched liquid air. The greater the flow rate of oxygen-enriched liquid air through the condenser 38, the greater is firstly the rate at which argon-enriched oxygen vapour is induced to flow into the rectification column 40 and secondly the rate of withdrawal of nitrogen impurity in this argon-enriched oxygen stream. The greater the rate of withdrawal of the nitrogen impurity, the lower is the nitrogen impurity level in the product oxygen. Hence, by choosing an appropriate setting of the valve 80 a maximum nitrogen concentration in the oxygen products need never be exceeded.

The presence of in the order of about 2 to about 3% by volume of argon impurity in the oxygen products inevitably entails a low recovery of argon product. Even argon recovery of about 20% which is readily achievable, will however, generally meet the requirements of the iron and steelmaking site for argon.

The method according to the invention is not limited to any particular steelmaking or iron making process. The operation of these processes may be conventional. Nor is the invention limited to any particular cryogenic air separation process. For example, instead of an arrangement of higher pressure rectification column 14 and low pressure rectification column 30 employing a single condenser-reboiler 24, a so-cooled "dual reboiler" process may be employed. In such a process, the condenser-reboiler 24 is isolated from the high pressure rectification column 14 and is instead heated by a stream of air taken from downstream of the cold end 12 of the main heat exchanger 8 and upstream of the inlet 16 to the higher pressure rectification column 14. A second reboiler is employed at an intermediate level of the low pressure rectification column 30 to supplement the upward flow of vapour provided by the reboiler 24 and to condense nitrogen vapour taken from the top of the higher pressure rectification column 14. An advantage of such dual reboiler arrangements is that they generally require a lower head pressure than comparable arrangements of the kind illustrated in the accompanying drawing.

In a typical example of the operation of the plant shown in the drawing, the oxygen products both have a purity of about 97.5% by volume and the low pressure rectification column 30 contains in the order of about 60% of the number of stages (theoretical trays) that it would have needed to employ were an oxygen product of about 99.7% purity to have been produced. Typically the booster-compressor has an outlet pressure in the order of 25 bar absolute in this example.

If desired a small part, say about 1%, of the liquid oxygen withdrawn from the low pressure column 30 through the outlet 64 may be stored as a liquid oxygen product and used for other purposes, say, cutting or scarfing. Instead of taking both the main oxygen products from the low pressure rectification column 30 in liquid state, one or both may be taken from the vapour formed in the reboiler-condenser 24, and raised to high pressure by a compressor downstream of the main heat exchanger 8.

The advantages of the invention are illustrated by the following comparative example, based on the process illustrated in the accompanying drawing, in which about 80% of the oxygen production flows at a pressure of about 11 bara to a Corex ironmaking plant and about 20% to a basic oxygen (steelmaking) plant.

|  | Conventional | Invention |
|---|---|---|
| Purity of ironmaking oxygen product | 95% | 97.5%* |
| Purity of steelmaking oxygen product | 99.5% | 97.5%* |
| Average purity of oxygen products | 95.9% | 97.5% |
| No of theoretical trays (stages) in a typical LP column 30 | 80 | 50 |
| Power consumption | 100% | 98% |

*the impurities include 2 volumes per million of nitrogen.

Thus, a substantial reduction in the height of the low pressure rectification column 30 is made possible by the invention. Further, an appreciable power saving can be achieved even though the average purity of the oxygen products is greater in the invention than it is in the comparative conventional process. The example chosen is typical because the demand for oxygen in an direct reduction ironmaking process is typically from about 5 to about 10 times than in an oxygen steelmaking process.

Further, the results obtained in the comparative example are not dependent upon the particular air separation process. Indeed, even greater comparative power savings are achievable if a dual reboiler air separation process is selected.

We claim:

1. An oxygen steelmaking method including:

contacting molten ferrous metal with a flow of oxygen gas separated from air by rectification;

the rectification being carried out in a column arrangement having low and higher pressure rectification columns, the oxygen being taken from the low pressure rectification column, and the oxygen gas containing from about 97 to about 98% by volume of oxygen but less than about 100 parts per million by volume of nitrogen impurity;

withdrawing an argon-enriched oxygen stream from the low pressure rectification column for separation in a further rectification column of said column arrangement; and controlling the flow rate of coolant through a condenser associated with the head of the further rectification column so as to control a level of said nitrogen impurity in the oxygen.

2. The method of claim 1, further comprising:

supplying both an oxygen steelmaking process and an ironmaking process with the oxygen gas;

supplying a first stream of the oxygen gas from the rectification to the steelmaking process; and supplying a second stream of the oxygen gas from the rectification to the ironmaking process.

3. The method as claimed in claim 1, in which the oxygen is taken from below all liquid-vapour contact elements in the low pressure rectification column.

4. The method as claimed in claim 2, wherein the nitrogen content of said oxygen is less than about 50 parts per million by volume.

5. The method as claimed in claim 2, wherein the nitrogen content of said oxygen is less than about 10 parts per million by volume.

* * * * *